United States Patent
Saito

(10) Patent No.: US 11,144,003 B2
(45) Date of Patent: Oct. 12, 2021

(54) IMAGE FORMING APPARATUS

(71) Applicant: CANON KABUSHIKI KAISHA, Tokyo (JP)

(72) Inventor: Takaaki Saito, Yoshikawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 134 days.

(21) Appl. No.: 16/535,416

(22) Filed: Aug. 8, 2019

(65) Prior Publication Data

US 2020/0073311 A1 Mar. 5, 2020

(30) Foreign Application Priority Data

Aug. 30, 2018 (JP) .............................. JP2018-162037

(51) Int. Cl.
- *G03G 15/00* (2006.01)
- *B65H 7/06* (2006.01)
- *B65H 29/52* (2006.01)

(52) U.S. Cl.
CPC .............. *G03G 15/70* (2013.01); *B65H 7/06* (2013.01); *B65H 29/52* (2013.01); *G03G 15/6502* (2013.01); *G03G 15/6573* (2013.01); *B65H 2404/166* (2013.01); *G03G 2215/0078* (2013.01); *G03G 2215/00679* (2013.01)

(58) Field of Classification Search
CPC .............. G03G 15/70; G03G 15/6502; G03G 15/6573; G03G 21/1623–1638; G03G 2215/00544; G03G 2215/00548; G03G 2215/00679; G03G 2215/0078; B65H 7/06; B65H 29/52; B65H 2204/166

See application file for complete search history.

(56) References Cited

U.S. PATENT DOCUMENTS 5,012,298 A * 4/1991 Johdai .................. G03G 15/234
399/402
6,339,685 B1 6/2002 Okamoto et al.
(Continued)

FOREIGN PATENT DOCUMENTS

| JP | 08-082960 A | 3/1996 |
| JP | 2000-214733 A | 8/2000 |

(Continued)

OTHER PUBLICATIONS

Office Action dated Aug. 4, 2020, in Japanese Patent Application No. 2018-162037.

*Primary Examiner* — Justin N Olamit

(74) *Attorney, Agent, or Firm* — Venable LLP

(57) ABSTRACT

An image forming apparatus includes an image forming unit; a reverse conveying roller; a discharge unit including a reverse conveying path, an openable and closable member, an open/close sensor, a discharge tray, a sheet conveyance unit, and a failure detector; and a controller. If the controller determines that the sheet conveyance unit is in failure based on a detection result of the failure detector and determines that the openable and closable member is closed based on a detection result of the open/close sensor, the controller prohibits discharge of the sheet to the discharge tray and permits conveyance of the sheet to the reverse conveying path, and if the controller determines that the sheet conveyance unit is in failure and determines that the openable and closable member is open, the controller prohibits the conveyance of the sheet to the reverse conveying path.

14 Claims, 13 Drawing Sheets

(56) References Cited

U.S. PATENT DOCUMENTS

| | | |
|---|---|---|
| 7,061,634 B1 | 6/2006 | Ogura et al. |
| 7,228,079 B2 * | 6/2007 | Brown ............... G03G 15/5012 399/18 |
| 9,354,576 B1 * | 5/2016 | Nakamichi ............ G03G 15/55 |
| 9,896,292 B2 * | 2/2018 | Kawakita ................. B65H 7/02 |
| 10,472,192 B2 | 11/2019 | Mizuta et al. |
| 2010/0310268 A1 | 12/2010 | Obata |
| 2013/0108284 A1 * | 5/2013 | Takata ............... G03G 21/1638 399/21 |
| 2017/0003637 A1 * | 1/2017 | Nakama ............... G03G 15/502 |
| 2017/0160695 A1 * | 6/2017 | Nakabayashi ......... G03G 15/70 |
| 2018/0198931 A1 | 7/2018 | Nakajima |

FOREIGN PATENT DOCUMENTS

| | | |
|---|---|---|
| JP | 2001-034117 A | 2/2001 |
| JP | 2001-335232 A | 12/2001 |
| JP | 2005-272046 A | 10/2005 |
| JP | 2018-101049 A | 6/2018 |
| JP | 2018-113576 A | 7/2018 |
| JP | 2018-118851 A | 8/2018 |

\* cited by examiner

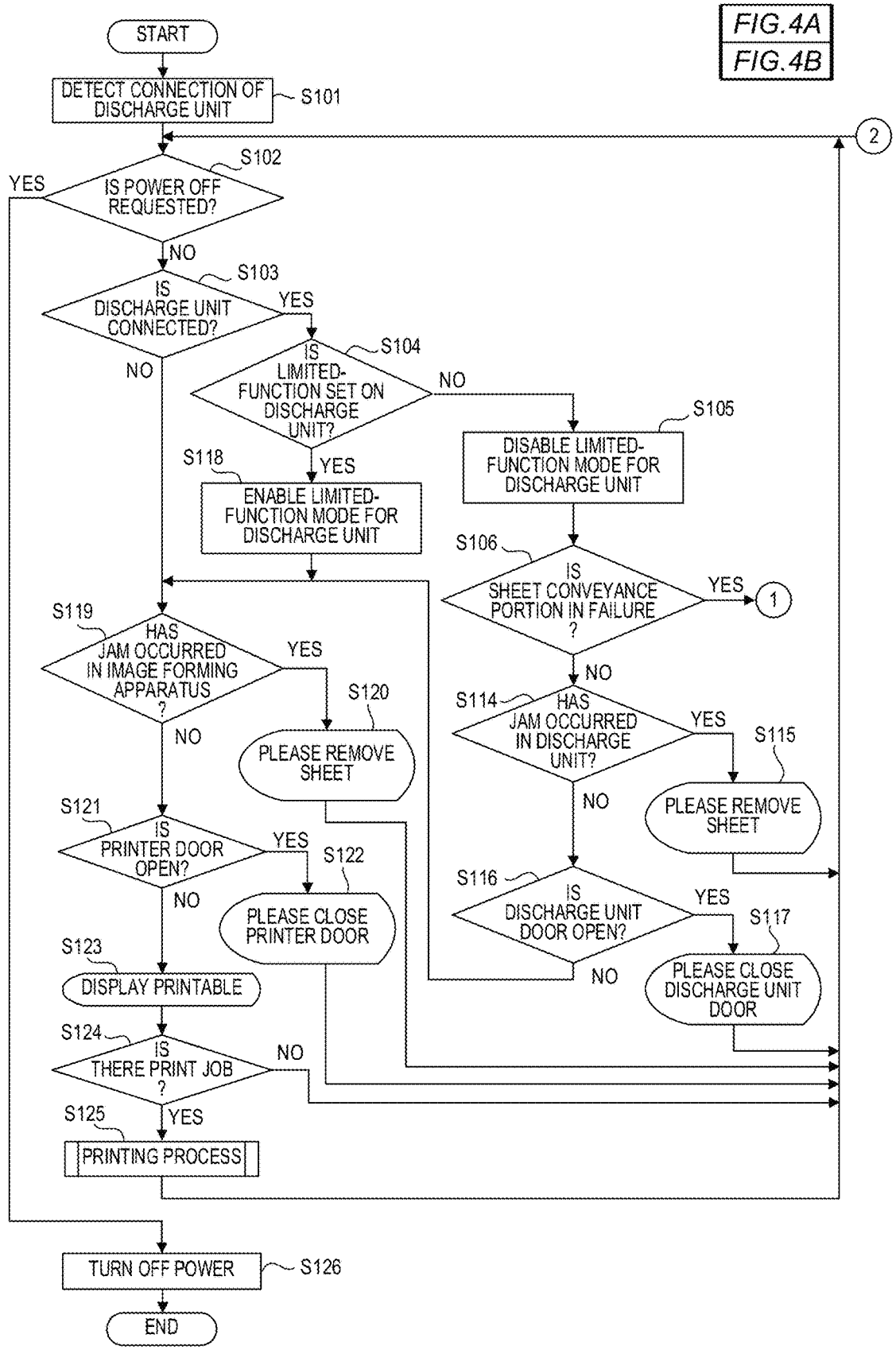

IMAGE FORMING APPARATUS

BACKGROUND OF THE DISCLOSURE

Field of the Disclosure

The present disclosure relates to an image forming apparatus including a discharge unit.

DESCRIPTION OF THE RELATED ART

Hitherto, there has been known an electrophotographic image forming apparatus configured to irradiate a photosensitive member with a laser beam to form an electrostatic latent image on the photosensitive member, to which a discharge unit such as a post-processing apparatus configured to perform post-processing on a sheet is connected. The discharge unit includes components such as a motor and a solenoid. In the discharge unit, when any one of the components is in failure, some functions which require use of the component in failure cannot be executed. In this case, when use of the entire discharge unit is prohibited, there arises a problem in that a user cannot allow execution of all the functions of the discharge units until repair of the component in failure is completed.

As a countermeasure against the problem described above, the following image forming apparatus is disclosed in Japanese Patent Application Laid-Open No. 2001-335232. The image forming apparatus prohibits execution of some functions which require use of the component in failure in the discharge unit, and permits execution of other functions which do not require the use of the component in failure. With the image forming apparatus described above, even when a component of the discharge unit is in failure, the user can allow execution of enabled functions of the discharge unit. Further, there is also known the following image forming apparatus. Specifically, when the entire discharge unit cannot be used due to the failure of the component, the image forming apparatus prohibits the use of the discharge unit, but permits image formation which does not require the use of the discharge unit.

However, for the purposes of reducing cost and installation size, in some cases, a duplex reversing conveyance path configured to reverse a front surface and a back surface of a sheet for duplex printing is formed in the discharge unit to be connected to the image forming apparatus. In some cases, the duplex reversing conveyance path is provided on an openable and closable member configured to open the discharge unit in some cases. The image forming apparatus may have the following configuration. Specifically, when the discharge unit having the duplex reversing conveyance path is in failure, the image forming apparatus disables the functions of the discharge unit and permits the image formation which does not require the use of the discharge unit. Such an operation mode is referred to as "limited-function mode". However, the functions of the discharge unit are disabled, and hence, in some cases, a user allows execution of the duplex printing under a state in which the openable and closable member of the discharge unit is open. In this case, a wall (guide) for defining the duplex reversing conveyance path in cooperation with the openable and closable member is open to the outside. Thus, the duplex reversing conveyance path is opened to cause a sheet jam in the duplex reversing conveyance path. As described above, when the openable and closable member of the discharge unit is open during the operation in the limited-function mode, the sheet is jammed due to the opening of the conveyance path to impair usability.

SUMMARY OF THE DISCLOSURE

An image forming apparatus according to one embodiment of the present disclosure comprises:
an image forming unit configured to form an image on a sheet;
a reverse conveying roller configured to convey the sheet on which the image is formed on a first surface of the sheet by the image forming unit, in a first direction and a second direction opposite to the first direction so as to reverse a front surface and a back surface of the sheet;
a discharge unit including:
 a reverse conveying path through which the sheet is conveyed by a conveying force applied by the reverse conveying roller without having a drive portion for applying a conveying force to the sheet to be conveyed by the reverse conveying roller;
 an openable and closable member configured to open and close the reverse conveying path;
 an open/close sensor configured to detect opening and closing of the openable and closable member;
 a discharge tray;
 a sheet conveyance unit configured to convey the sheet so as to discharge the sheet to the discharge tray; and
 a failure detector configured to detect a failure of the sheet conveyance unit; and
a controller,
wherein in a case in which the controller determines that the sheet conveyance unit is in failure based on a detection result of the failure detector and determines that the openable and closable member is closed based on a detection result of the open/close sensor, the controller prohibits discharge of the sheet to the discharge tray and permits conveyance of the sheet to the reverse conveying path, and
wherein in a case in which the controller determines that the sheet conveyance unit is in failure and determines that the openable and closable member is open based on the detection result of the open/close sensor, the controller prohibits the conveyance of the sheet to the reverse conveying path.

Further features of the present disclosure will become apparent from the following description of exemplary embodiments with reference to the attached drawings.

Figure 4B:
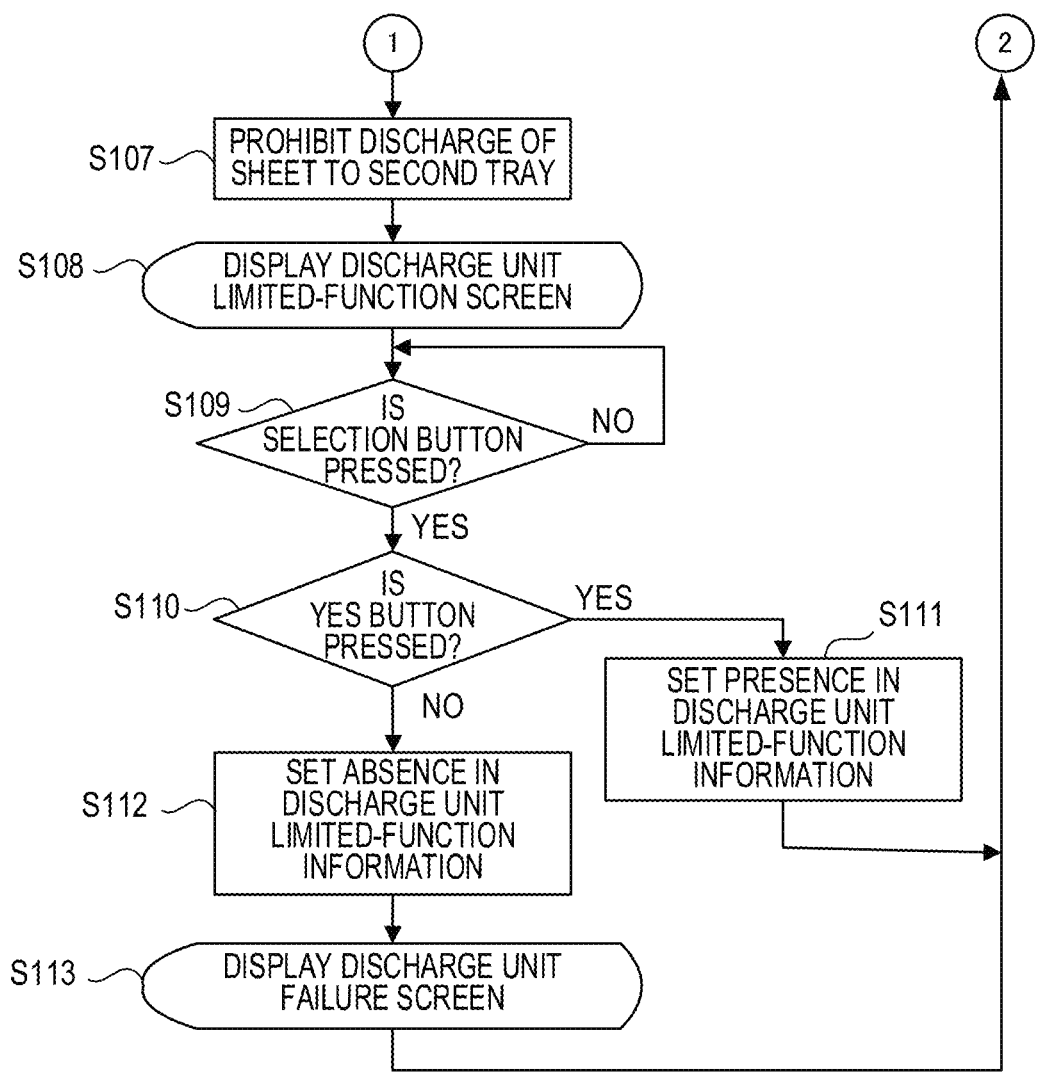

FIG. which is composed of FIG. 4A and FIG. 4B, depicts flowcharts for illustrating a printing process performed by the image forming apparatus when the image forming apparatus operates in a discharge prohibition mode.

Figure 5:
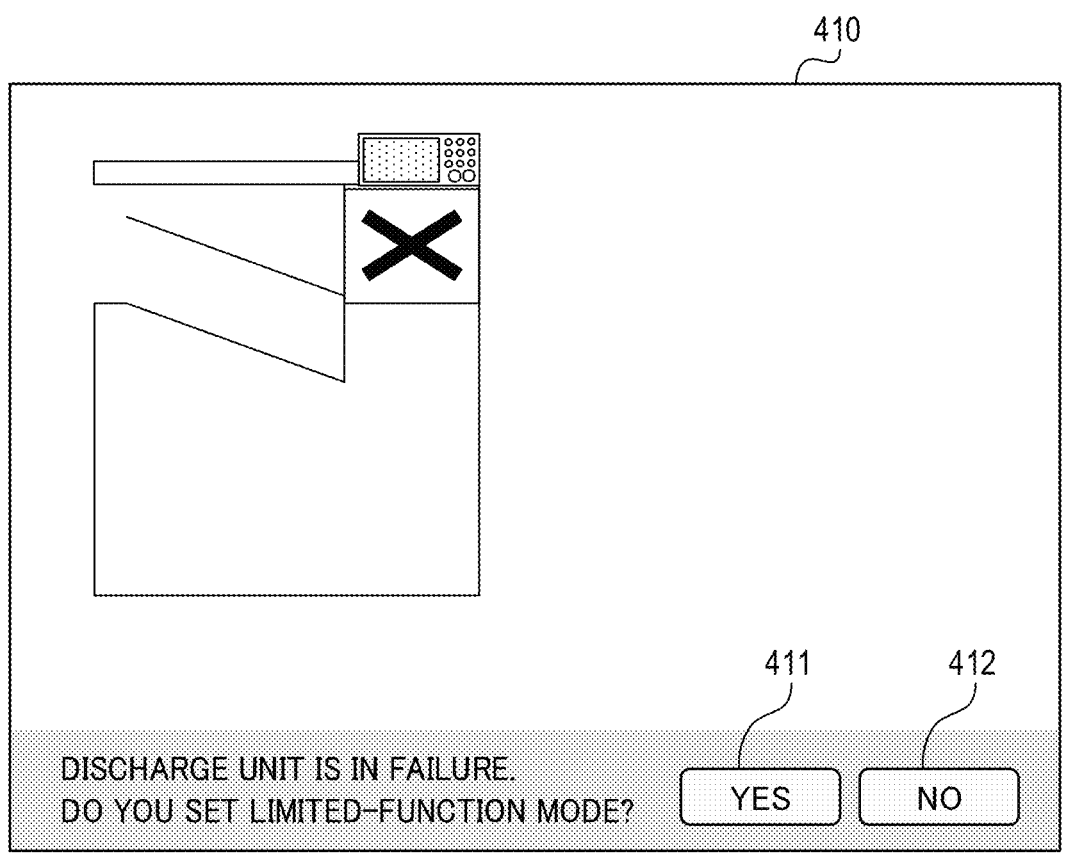

FIG. 5 is a view for illustrating a discharge unit limited-function screen displayed on an operation display unit.

Figure 6:
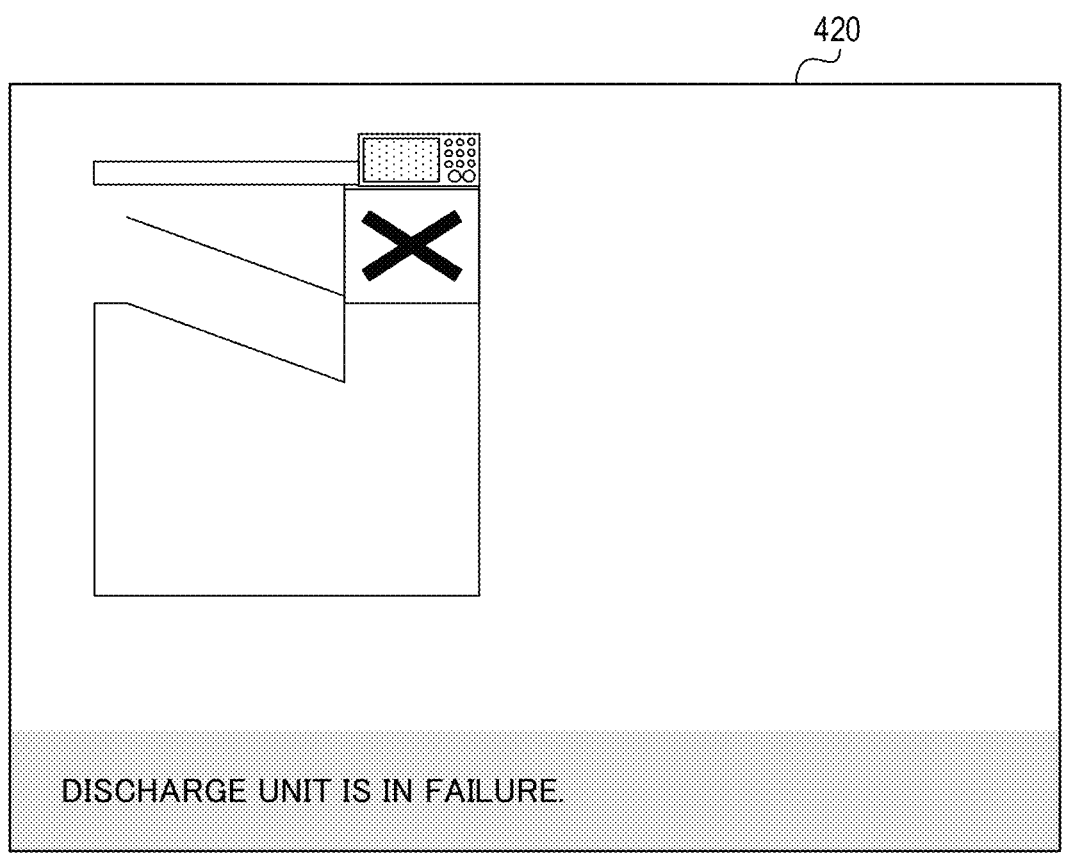

FIG. 6 is a view for illustrating a discharge unit failure screen displayed on the operation display unit.

Figure 7:
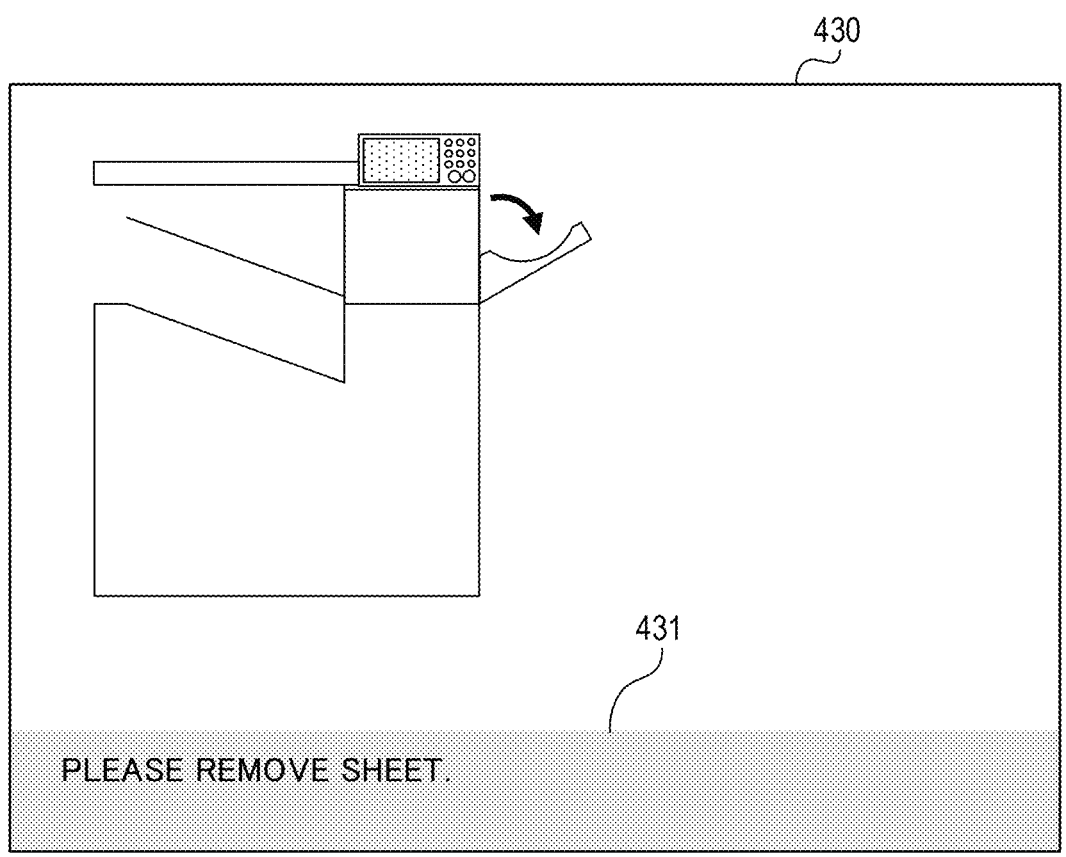

FIG. 7 is a view for illustrating a jam notification screen for a jam occurring in a display unit, which is displayed on the operation display unit.

Figure 8:
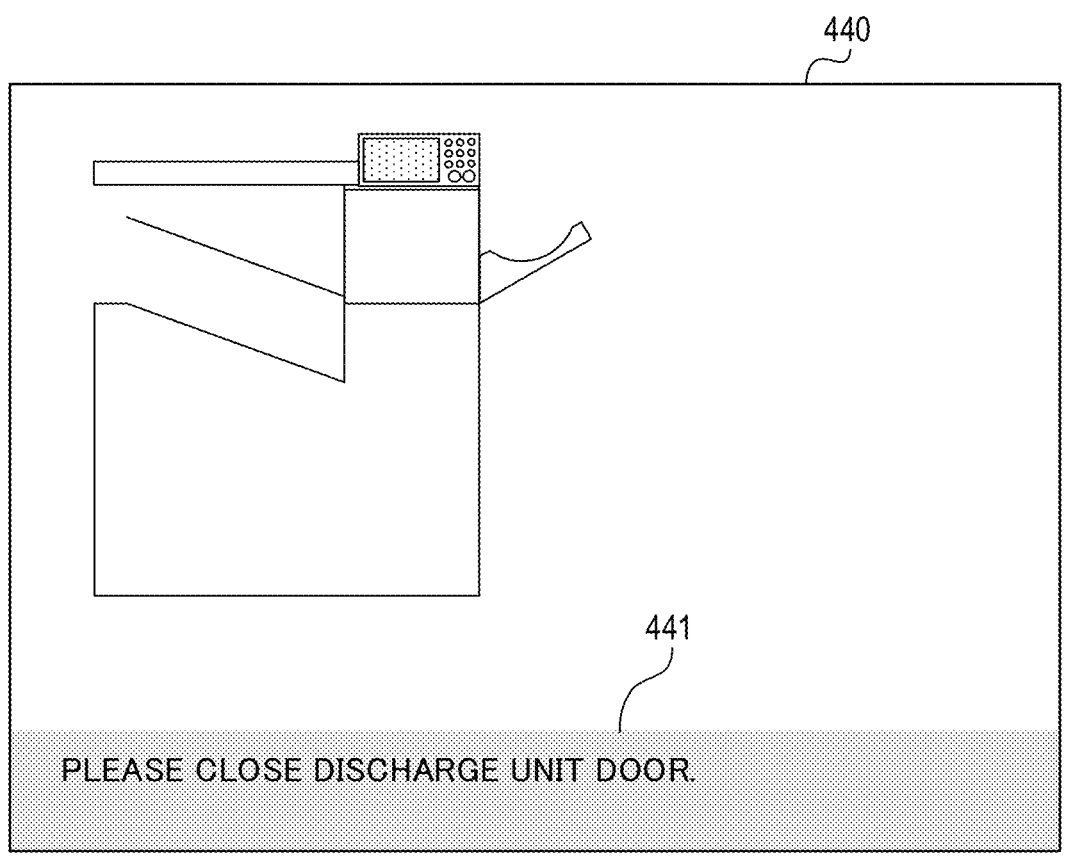

FIG. 8 is a view for illustrating a notification screen displayed on the operation display unit when the discharge unit door is open.

Figure 9:
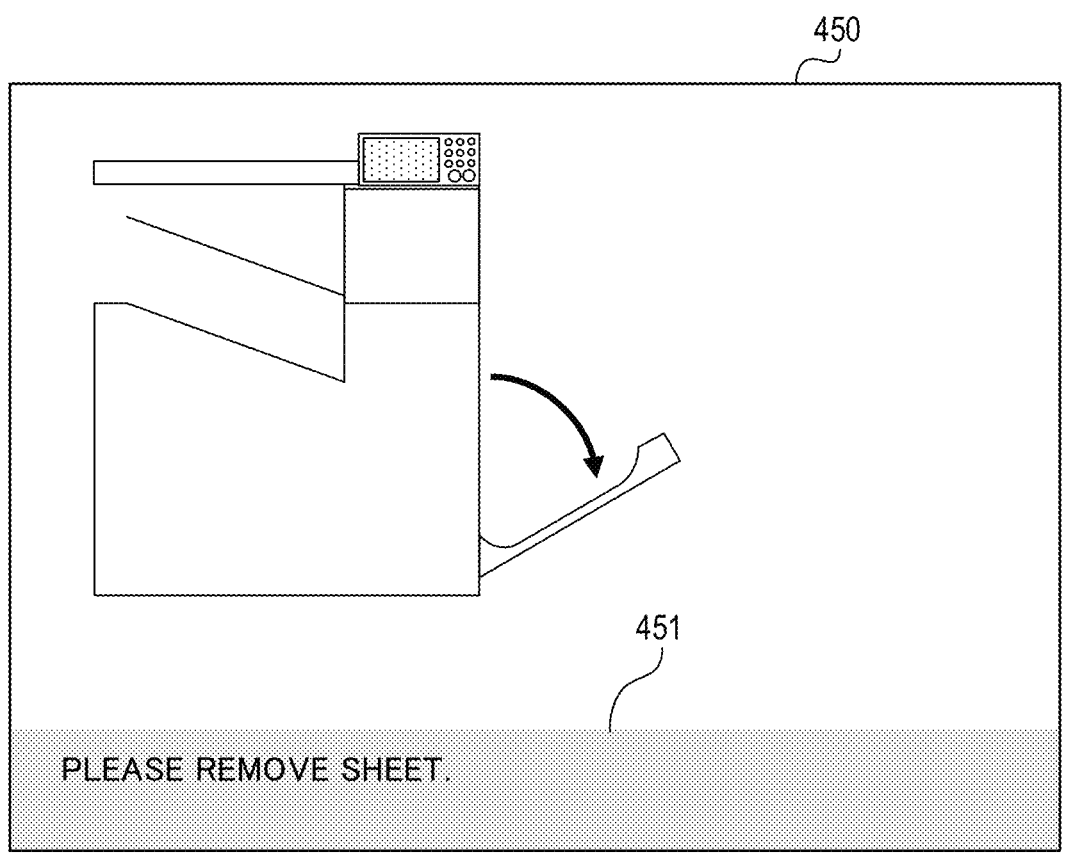

FIG. 9 is a view for illustrating a jam notification screen for a jam occurring in an image forming apparatus, which is displayed on the operation display unit.

Figure 10:
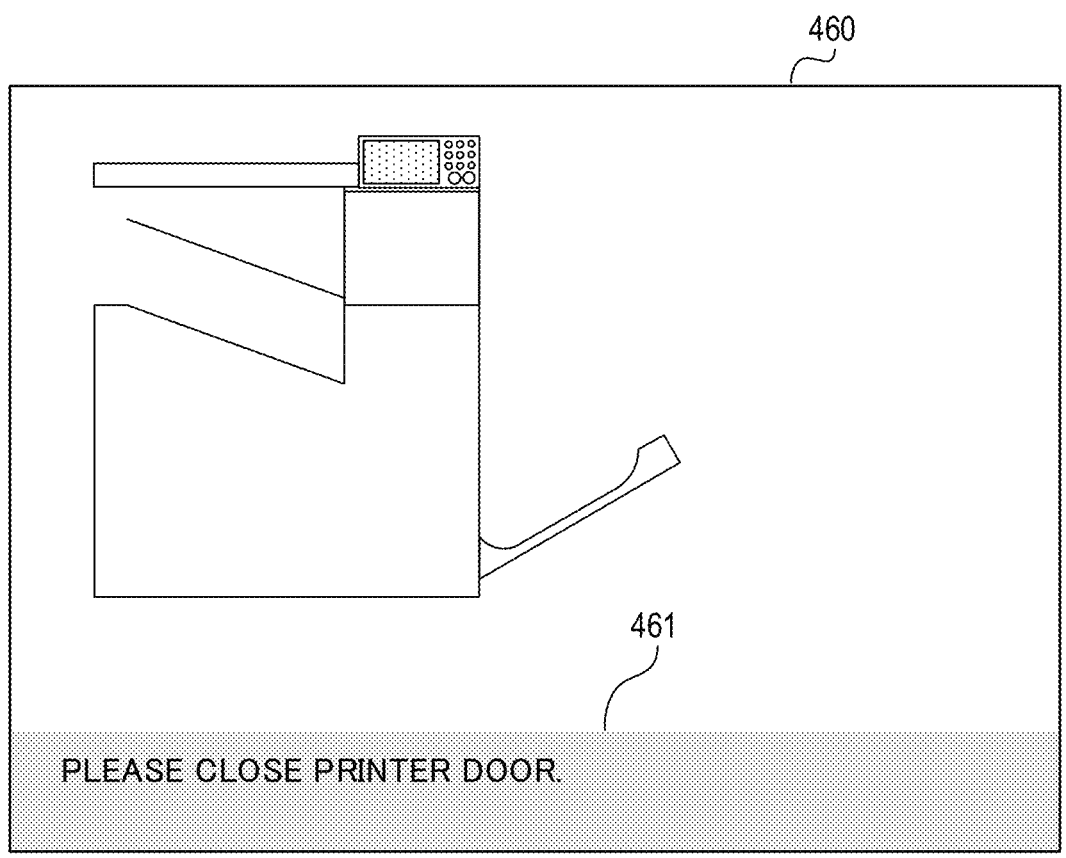

FIG. 10 is a view for illustrating a printer door open notification screen displayed on the operation display unit.

Figure 11:
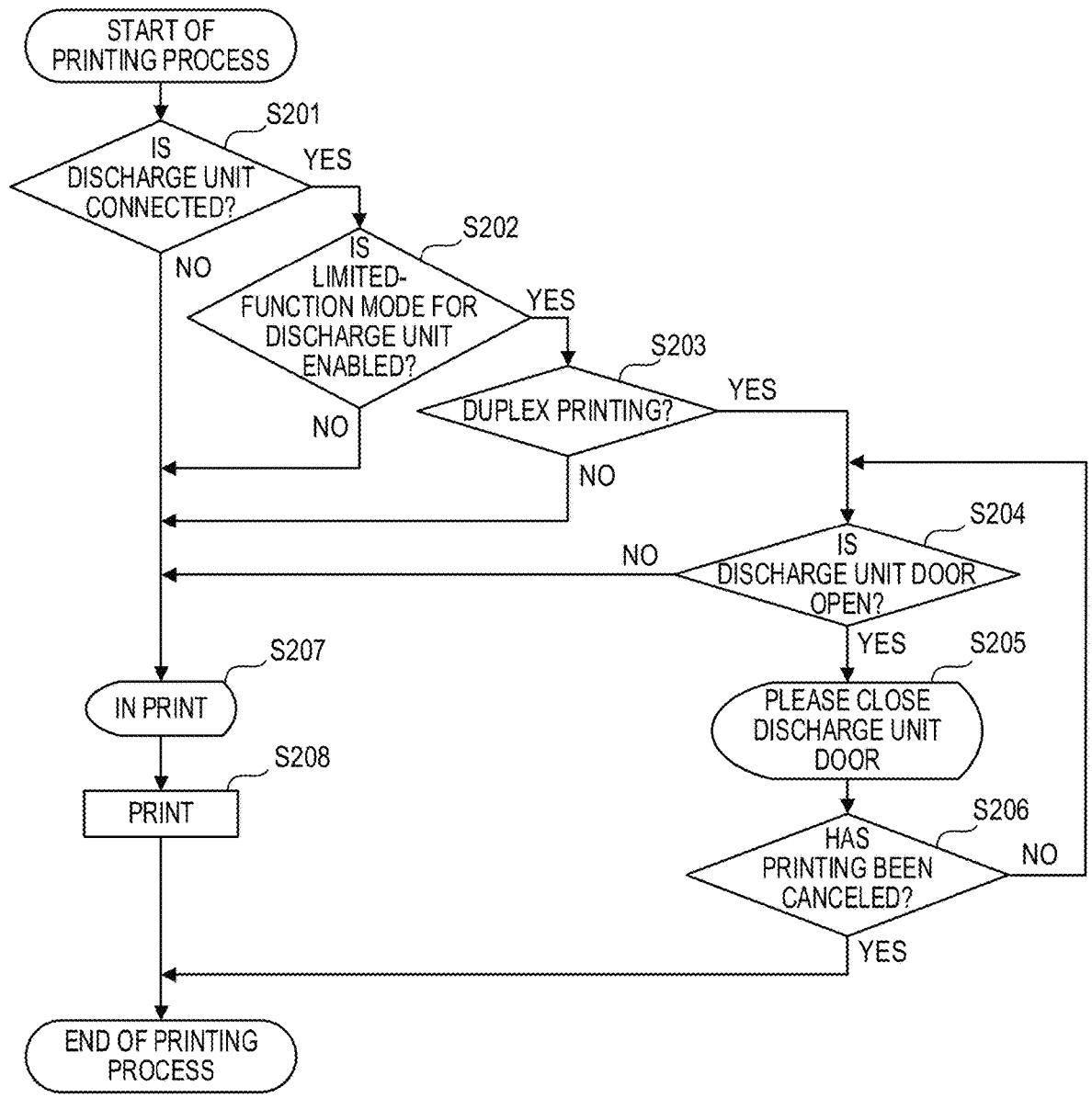

FIG. 11 is a flowchart for illustrating a printing process performed in the image forming apparatus, which is executed by a CPU.

DESCRIPTION OF THE EMBODIMENTS

<Image Forming Apparatus>

Figure 1A:
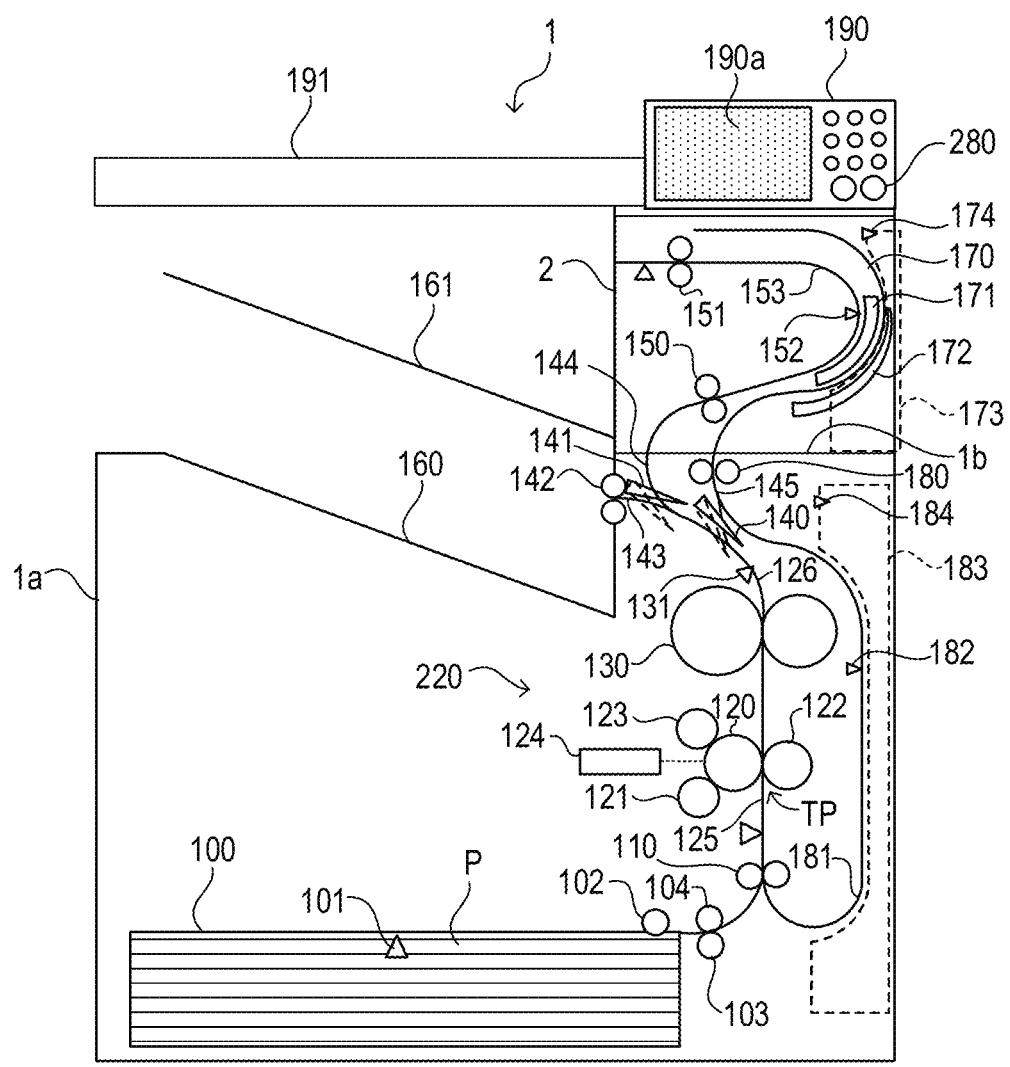
FIG. 1A and FIG. 1B are sectional views of an image forming apparatus.
Figure 1B:
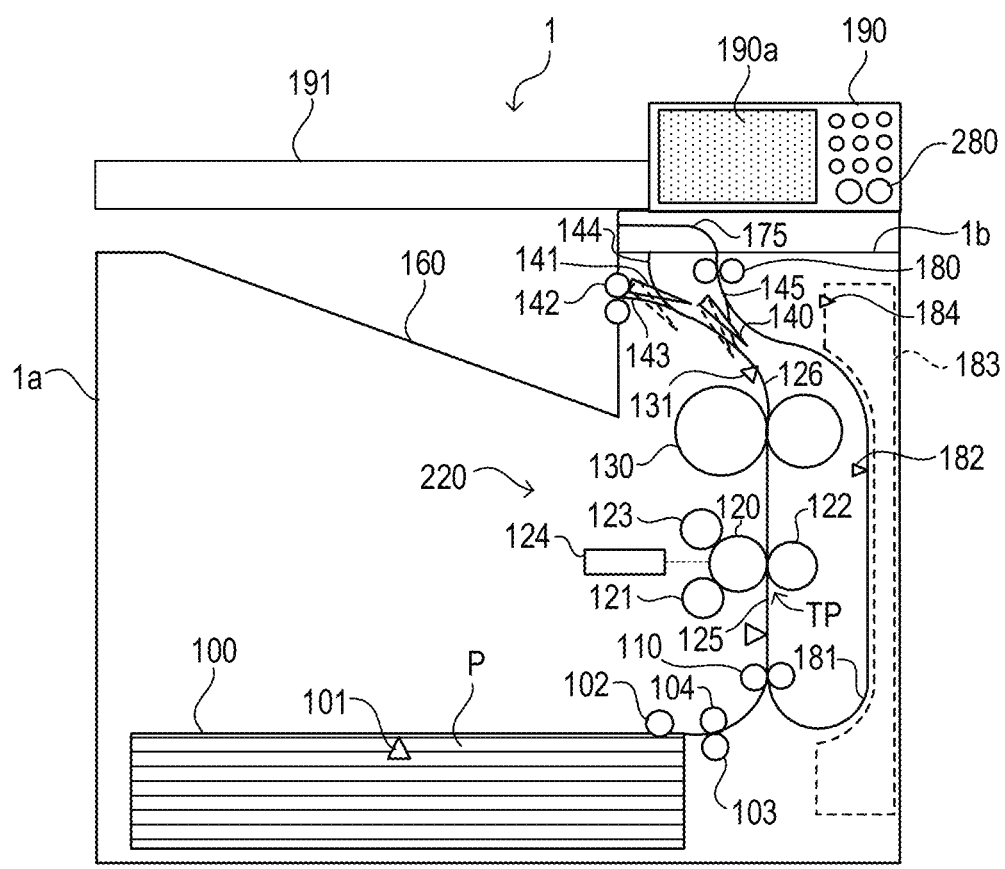

An image forming apparatus 1 according to this embodiment is described. FIG. 1A and FIG. 1B are sectional views of the image forming apparatus 1. The image forming apparatus 1 is configured to form an image on a recording medium through an electrophotographic image formation process. As the image forming apparatus 1, there exist, for example, an electrophotographic copying machine (for example, a digital copying machine), an electrophotographic printer (for example, a color laser beam printer or a color LED printer), a multifunction peripheral (MFP), and a facsimile machine. The image forming apparatus 1 of this embodiment is configured to form a monochrome image. However, the present disclosure is not limited to the image forming apparatus configured to form a monochrome image. The image forming apparatus 1 may be configured to form a color image. The recording medium is a transfer material on which an image is formed by the image forming apparatus 1, and is, for example, paper, an OHP sheet, or cloth. In the following description, the recording medium is described as a "sheet P". The image forming apparatus 1 includes an image reader 191 configured to read an image of an original. However, the image forming apparatus 1 is not always required to include the image reader 191. A discharge unit 2 such as a post-processing apparatus (finisher) configured to perform post-processing on the sheet P can be connected to the image forming apparatus 1. The post-processing includes, for example, processing such as alignment, sort, punch, and binding for the sheets P. The discharge unit 2 has a function of executing the post-processing (post-processing function). However, the discharge unit 2 may have merely a function of discharging the sheet P. FIG. 1A is a view for illustrating the image forming apparatus 1 to which the discharge unit 2 is mounted. FIG. 1B is a view for illustrating the image forming apparatus 1 without the discharge unit 2. As illustrated in FIG. 1A and FIG. 1B, the discharge unit 2 is removably mounted to a mounting portion 1b formed in an upper part of a main body 1a of the image forming apparatus 1.

The image forming apparatus 1 includes an image forming portion 220 configured to form an image on the sheet P. The image forming portion 220 includes a photosensitive drum (image bearing member) 120 serving as a photosensitive member. A charging device 123, an exposure device 124, a developing device 121, and a transfer roller 122 serving as a transfer device are arranged around the photosensitive drum 120. The transfer roller 122 is arranged so as to be opposed to the photosensitive drum 120 to thereby form a transfer portion TP. The charging device 123 is configured to uniformly charge a surface of the photosensitive drum 120. The exposure device 124 is configured to irradiate the uniformly charged surface of the photosensitive drum 120 with a light beam modulated in accordance with image data to form an electrostatic latent image on the surface of the photosensitive drum 120. The developing device 121 is configured to develop the electrostatic latent image with a toner to form a toner image.

A feed cassette 100 configured to store the sheet P is arranged in a lower part of the image forming apparatus 1. A pickup roller 102 is configured to pick up the sheet P in the feed cassette 100. The sheets P, which are picked up by the pickup roller 102, are separated one by one by a feed roller 104 and a retard roller 103 to be fed. The sheet P, which is fed by the feed roller 104, is brought into abutment against registration rollers 110 in a stopped state to correct skew feed. The registration rollers 110 start rotating so that a leading edge of the sheet P matches a leading edge of the toner image formed on the photosensitive drum 120 in the transfer portion TP to convey the sheet P to the transfer portion TP through a conveyance path 125 that is approximately vertical. The transfer roller 122 is configured to transfer the toner image formed on the photosensitive drum 120 onto the sheet P. Fixing rollers 130 serving as a fixing portion are arranged downstream of the transfer portion TP in a conveyance direction for the sheet P. The fixing rollers 130 apply heat and a pressure onto the toner image transferred onto the sheet P to fix the toner image onto the sheet P to thereby form an image on the sheet P.

A discharge tray (hereinafter referred to as "first tray") 160 is provided to the main body 1a of the image forming apparatus 1. A discharge tray (hereinafter referred to as "second tray") 161 is provided to the discharge unit 2. When the discharge unit 2 is mounted to the image forming apparatus 1 as illustrated in FIG. 1A, the sheet P carrying the image formed thereon is discharged to the first tray 160 or the second tray 161. When the discharge unit 2 is not mounted to the image forming apparatus 1 as illustrated in FIG. 1B, the sheet P carrying the image formed thereon is discharged to the first tray 160.

The image forming apparatus 1 includes an openable and closable member (hereinafter referred to as "printer door") 183 openably and closably provided to the main body 1a. When the sheet P is jammed in the image forming apparatus 1, a user opens the printer door 183 to remove the sheet P from the image forming apparatus 1. The image forming apparatus 1 includes a door open/close sensor 184 configured to detect an open/closed state of the printer door 183. The image forming apparatus 1 includes an operation display unit 190. The user inputs an instruction and information such as an image formation start instruction, an image reading instruction, and information about the image formation (hereinafter referred to as "printing information") through the operation display unit 190. Further, the operation display unit 190 displays information such as a state of the image forming apparatus 1, the printing information, and an alert on a display portion 190a.

<Discharge Unit>

As illustrated in FIG. 1A, the discharge unit 2 is removably mounted to the mounting portion 1b formed in the upper part of the main body 1a of the image forming apparatus 1, and is configured to allow connection of a conveyance path in the display unit 2 to a conveyance path in the main body 1a. In this example, the discharge unit 2 is arranged between the main body 1a of the image forming apparatus 1 and the image reader 191. The image reader 191 is removably mounted to an upper part of the discharge unit 2. Meanwhile, when the discharge unit 2 is not mounted to the image forming apparatus 1, as illustrated in FIG. 1B, the image reader 191 is removably mounted to the mounting portion 1b formed on the upper part of the main body 1a of the image forming apparatus 1.

The discharge unit 2 includes the second tray 161 and a discharge conveyance path (hereinafter referred to as "second discharge path") 153. The sheet having the image formed thereon is discharged to the second tray 161. The second discharge path 153 is configured to convey the sheet so that the sheet carrying the image formed thereon by the image forming portion 220 is discharged to the second tray 161. Inlet rollers 150 and discharge rollers 151 are provided to the second discharge path 153. The inlet rollers 150 are configured to receive the sheet from the main body 1a of the image forming apparatus 1. The discharge rollers 151 are configured to discharge the sheet from the second discharge path 153 to the second tray 161. The discharge unit 2 has a duplex reversing conveyance path (first reversing conveyance path) 170 through which the sheet to be conveyed by duplex reversing rollers 180 serving as a duplex reversing unit is temporarily conveyed so as to reverse a front surface and a back surface of the sheet. The duplex reversing conveyance path 170 is defined by a discharge unit conveyance guide (guide member) 171 and a discharge unit duplex reversing guide (guide member) 172. The duplex reversing conveyance path 170 does not have a drive portion configured to apply a conveying force to the sheet to be reversed by the duplex reversing rollers 180. The sheet is conveyed with a conveying force applied by the duplex reversing rollers 180 through the duplex reversing conveyance path 170. The discharge unit 2 includes an openable and closable member (hereinafter referred to as "discharge unit door") 173 openably and closably provided to the discharge unit 2 so as to open and close the duplex reversing conveyance path 170. When the sheet P is jammed in the discharge unit 2, the user opens the discharge unit door 173 to remove the sheet P from the discharge unit 2. The discharge unit duplex reversing guide 172 is coupled to the discharge unit door 173. The discharge unit duplex reversing guide 172 is configured to be movable in conjunction with an opening and closing operation of the discharge unit door 173. When the discharge unit door 173 is opened, the discharge unit duplex reversing guide 172 is also moved toward the discharge unit door 173. Further, the discharge unit conveyance guide 171 has a structure capable of moving by its own weight when the discharge unit door 173 is opened. With the structure described above, the user can easily remove the sheet P in the discharge unit 2.

<Sheet Conveyance Path>

Now, with reference to FIG. 1A and FIG. 1B, the sheet conveyance path in the image forming apparatus 1 is described. A discharge flapper 141 switches a destination of conveyance of the sheet carrying the image formed thereon by the image forming portion 220, which has been conveyed through a conveyance path 126, to any one of a discharge conveyance path (hereinafter referred to as "first discharge path") 143 and a first branched path 144. When the sheet is discharged to the first tray 160, the discharge flapper 141 is turned upward to a position indicated by the solid line in FIG. 1A so as to discharge the sheet through the first discharge path 143 to the first tray 160 with use of discharge rollers 142. When the sheet is discharged to the second tray 161, the discharge flapper 141 is turned downward to a position indicated by the broken line in FIG. 1A so as to convey the sheet into the first branched path 144 branched from the first discharge path 143. The first branched path 144 is connected to the second discharge path 153 of the discharge unit 2. The sheet is discharged through the second discharge path 153 to the second tray 161 by the discharge rollers 151. The discharge unit 2 can execute post-processing of discharging the sheet to the second tray 161 after shifting the sheet in a horizontal direction with use of a shift mechanism (not shown).

A duplex flapper 140 switches the destination of conveyance of the sheet carrying the image formed thereon by the image forming portion 220, which has been conveyed through the conveyance path 126, to any one of the first discharge path 143 and a second branched path 145. When duplex printing is executed under a state in which the discharge unit 2 is mounted to the image forming apparatus 1, the duplex flapper 140 is turned downward to a position indicated by the broken line in FIG. 1A. The sheet having a first surface (front surface) carrying the image formed thereon by the image forming portion 220 is conveyed to the second branched path 145 branched from the conveyance path 126. The second branched path 145 is connected to the duplex reversing conveyance path 170 in the discharge unit 2. The duplex reversing rollers 180 provided on the second branched path 145 are rotated forward to convey the sheet to the duplex reversing conveyance path 170 in the discharge unit 2 (in a first direction). After that, the duplex reversing rollers 180 are rotated backward to convey the sheet from the duplex reversing conveyance path 170 to a duplex conveyance path 181 formed in the main body 1a of the image forming apparatus 1 (in a second direction). In this manner, the front surface and the back surface of the sheet are reversed. The sheet is conveyed to the transfer portion TP by the registration rollers 110 through the duplex conveyance path 181. An image is formed on a second surface (back surface) of the sheet by the image forming portion 220. Then, the sheet is discharged to the first tray 160 or the second tray 161.

As illustrated in FIG. 1B, when the discharge unit 2 is not mounted to the image forming apparatus 1, the image reader 191 is mounted to the upper part of the main body 1a of the image forming apparatus 1 through intermediation of a reversing conveyance path (hereinafter referred to as "second reversing conveyance path") 175. The second reversing conveyance path 175 formed on a bottom surface of the image reader 191 is connected to a conveyance path in a nip portion formed between the duplex reversing rollers 180. When the discharge unit 2 is not mounted to the image forming apparatus 1, the sheet carrying the image formed thereon is discharged only to the first tray 160 because of the absence of the second tray 161. Thus, when the discharge unit 2 is not mounted to the image forming apparatus 1, the discharge flapper 141 is fixed at a position indicated by the solid line in FIG. 1B.

When duplex printing is executed under a state in which the discharge unit 2 is not mounted to the image forming apparatus 1, the duplex flapper 140 is turned downward to the position indicated by the broken line in FIG. 1B to convey the sheet having the first surface (front surface) carrying the image formed thereon to the duplex reversing rollers 180. The duplex reversing rollers 180 are rotated forward to convey the sheet to the second reversing conveyance path 175. After that, the duplex reversing rollers 180 are rotated backward to convey the sheet from the second reversing conveyance path 175 to the duplex conveyance path 181. In this manner, the front surface and the back surface of the sheet are reversed. The sheet is conveyed to the transfer portion TP by the registration rollers 110 through the duplex conveyance path 181. An image is formed on a second surface (back surface) of the sheet by the image forming portion 220. Then, the sheet is discharged to the first tray 160.

<Control System>

Figure 2:
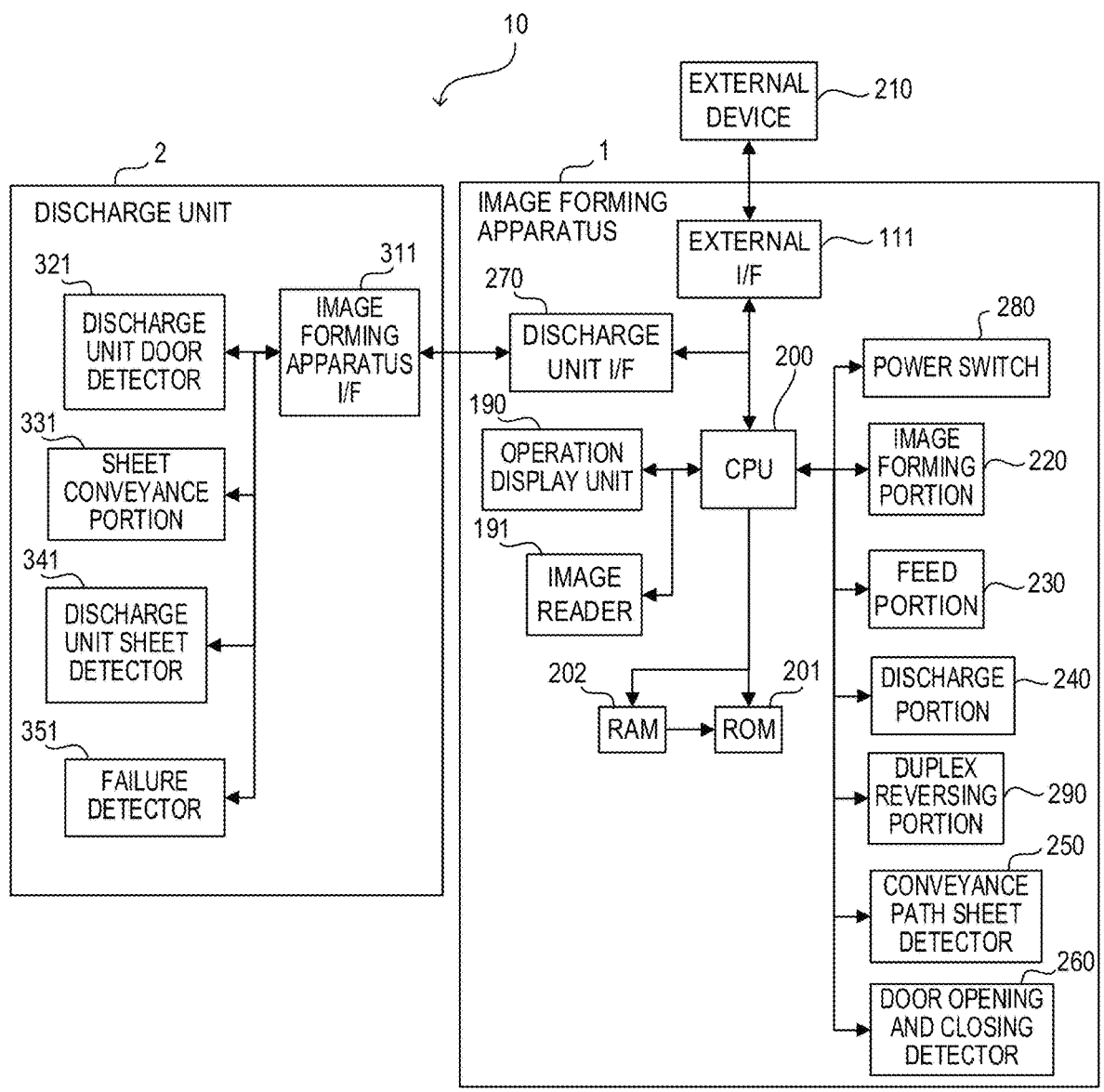
FIG. 2 is a block diagram of a control system configured to control the image forming apparatus.

Now, with reference to FIG. 2, a control system 10 configured to control the image forming apparatus 1 is described. FIG. 2 is a block diagram of the control system 10 configured to control the image forming apparatus 1. The control system 10 includes a central processing unit (hereinafter referred to as "CPU") 200, a read only memory (hereinafter referred to as "ROM") 201, and a random access memory (hereinafter referred to as "RAM") 202. The CPU 200 serving as a controller is connected to an external device 210 such as a personal computer via an external interface (hereinafter referred to as "external IX") 111 such as a USB cable. The CPU 200 is connected to the discharge unit 2 via a discharge unit interface (hereinafter referred to as "discharge unit I/F) 270. The CPU 200 is electrically connected to the image forming portion 220, a feed portion 230, a discharge portion 240, a duplex reversing portion 290, a conveyance path sheet detector 250, a door opening and closing detector 260, a power switch 280, the operation display unit 190, and the image reader 191. The duplex reversing portion 290 includes a motor configured to drive the duplex reversing rollers 180, and rotates the duplex reversing rollers 180 forward or backward with use of the motor. Similarly, the feed portion 230 and the discharge portion 240 include motors configured to drive rollers included in the feed portion 230 and the discharge portion 240, respectively.

The CPU 200 starts a printing process (image forming operation) based on the printing information acquired from the external device 210 via the external OF 111. Further, when the user operates the operation display unit 190 to allow execution of a copying operation with use of the image reader 191, the CPU 200 acquires the printing information from the operation display unit 190 and the image reader 191 to start a printing process (image forming operation). The CPU 200 executes the printing operation performed by the image forming apparatus 1 with use of the printing information in accordance with a control program stored in the ROM 201. The CPU 200 writes processing data in the printing operation into the RAM 202 and reads the processing data from the RAM 202.

The power switch 280 is turned ON/OFF by the user to turn ON/OFF power of the image forming apparatus 1. The CPU 200 controls ON/OFF of the power of the image forming apparatus 1 based on a determination that the power switch 280 is pressed by the user. The CPU 200 controls the image forming portion 220 to form the toner image on the photosensitive drum 120, transfers the toner image onto the sheet P with use of the transfer roller 122, and fixes the toner image onto the sheet with use of the fixing rollers 130. The CPU 200 controls the duplex reversing rollers 180 through the duplex reversing portion 290 so as to reverse the front surface and the back surface of the sheet P having the front surface (first surface) carrying the image formed thereon so as to be able to form the image on the back surface (second surface).

The conveyance path sheet detector 250 is electrically connected to a fixing sensor 131 and a duplex sensor 182. The fixing sensor 131 is arranged downstream of the fixing rollers 130 in the conveyance path 126, and is configured to detect the sheet discharged through the fixing rollers 130 to output a detection signal. The duplex sensor 182 is arranged in the duplex conveyance path 181, and is configured to detect the sheet conveyed through the duplex conveyance path 181 to output a detection signal. When it is determined that a time period during which the conveyance path sheet detector 250 has detected the sheet P is equal to or longer than a predetermined time period or a time period during which the conveyance path sheet detector has not detected the sheet P is equal to or longer than a predetermined time period based on the detection signal from the fixing sensor 131 or the detection signal from the duplex sensor 182, the CPU 200 determines that a jam has occurred in the image forming apparatus 1. The door opening and closing detector 260 is electrically connected to the door open/close sensor 184. The door open/close sensor 184 detects an open/closed state of the printer door 183 to output a detection signal to the door opening and closing detector 260. The CPU 200 determines whether the printer door 183 is open or not based on a result of detection performed by the door opening and closing detector 260 based on the detection signal from the door open/close sensor 184. The CPU 200 acquires operation information of the user through the operation display unit 190. Further, the CPU 200 displays, for example, the printing information or the alert on the operation display unit 190 serving as a display unit. The CPU 200 controls the image reader 191 to read the image of the original.

The discharge unit 2 includes an image forming apparatus interface (hereinafter referred to as "image forming apparatus I/F") 311 configured to communicate with the discharge unit I/F 270 of the image forming apparatus 1. The discharge unit 2 further includes a discharge unit door detector 321, a sheet conveyance portion 331, a discharge unit sheet detector 341, and a failure detector 351, which are electrically connected to the image forming apparatus I/F 311. When the sheet P is conveyed from the image forming apparatus 1 to the discharge unit 2, the CPU 200 notifies the image forming apparatus I/F 311 of the discharge unit 2 of command information via the discharge unit I/F 270. The discharge unit 2 drives the sheet conveyance portion 331 based on the command information received via the discharge unit I/F 270. The failure detector 351 is configured to detect a failure of the sheet conveyance portion 331 serving as a sheet conveyance unit. When detecting a failure of the sheet conveyance portion 331, the failure detector 351 notifies the CPU 200 of the occurrence of the failure of the sheet conveyance portion 331 via the image forming apparatus I/F 311 and the discharge unit I/F 270.

The discharge unit sheet detector 341 is electrically connected to a conveyance path sensor 152. The conveyance path sensor 152 is arranged in the second discharge path 153, and is configured to detect the sheet conveyed through the second discharge path 153 to output a detection signal. When it is determined that a time period during which the discharge unit sheet detector 341 has detected the sheet P is equal to or longer than a predetermined time period or a time period during which the discharge unit sheet detector 341 has not detected the sheet P is equal to or longer than a predetermined time period based on the detection signal from the conveyance path sensor 152, the CPU 200 determines that a jam has occurred in the discharge unit 2. The discharge unit door detector 321 is electrically connected to a discharge unit door sensor 174. The discharge unit door sensor 174 serving as an open/close sensor is configured to detect an open/closed state of the discharge unit door 173 to output a detection signal to the discharge unit door detector 321. The discharge unit door detector 321 of the discharge unit 2 outputs a result of detection based on the detection signal from the discharge unit door sensor 174 via the image forming apparatus I/F 311 and the discharge unit I/F 270 to the CPU 200. The CPU 200 determines whether the discharge unit door 173 is open or not based on the result of detection performed by the discharge unit door detector 321.

<Basic Operation of Image Forming Apparatus>

Next, with reference to FIG. 1A and FIG. 2, a basic operation of the image forming apparatus 1 under a state in which the discharge unit 2 is mounted to the image forming apparatus 1 is described. After acquiring the printing information from the external device 210 such as a personal computer, the CPU 200 starts the printing operation. The CPU 200 starts feeding the sheet P from the feed cassette 100 with use of the pickup roller 102. The CPU 200 separates the sheets P one by one with use of the feed roller 104 and the retard roller 103 to feed the sheet P to the registration rollers 110. The CPU 200 detects the presence/absence of the sheet P in the feed cassette 100 with use of a sheet sensor 101. The CPU 200 starts the rotation of the registration rollers 110 at timing in synchronization with the toner image formed on the photosensitive drum 120 by the developing device 121 to convey the sheet P to the transfer portion TP. The CPU 200 transfers the toner image formed on the photosensitive drum 120 onto the sheet P with use of the transfer roller 122. The CPU 200 conveys the sheet P to the fixing rollers 130 with use of the transfer roller 122. The CPU 200 applies the heat and the pressure onto the toner image with use of the fixing rollers 130 to fix the toner image onto the sheet P.

When detecting the leading edge of the sheet P carrying the image formed thereon with use of the fixing sensor 131, the CPU 200 switches the position of the duplex flapper 140 and the position of the discharge flapper 141 in accordance with the destination of conveyance of the sheet P. When the sheet P is to be discharged to the first tray 160, the CPU 200 switches the duplex flapper 140 to the position indicated by the solid line in FIG. 1A and the discharge flapper 141 to the position indicated by the solid line in FIG. 1A. The sheet P is conveyed to the discharge rollers 142, and the sheet P is discharged to the first tray 160 by the discharge rollers 142 with the surface carrying the image formed thereon (printed surface) oriented downward.

When the sheet P is to be discharged to the second tray 161, the CPU 200 switches the duplex flapper 140 to the position indicated by the solid line in FIG. 1A and the discharge flapper 141 to the position indicated by the broken line in FIG. 1A. The sheet P is conveyed to the inlet rollers 150 of the discharge unit 2. The CPU 200 outputs a conveyance instruction to the discharge unit 2 via the discharge unit I/F 270 and the image forming apparatus I/F 311. The CPU 200 drives the sheet conveyance portion 331 to convey the sheet P to the discharge rollers 151 through the second discharge path 153 by the inlet rollers 150. The sheet P is discharged to the second tray 161 by the discharge rollers 151 with the surface carrying the image formed thereon (printed surface) oriented downward.

When the image is also to be formed on the second surface of the sheet P, the CPU 200 switches the orientation of the duplex flapper 140 as indicated by the broken line in FIG. 1A. The sheet P is conveyed to the duplex reversing rollers 180. The CPU 200 rotates the duplex reversing rollers 180 forward to convey the sheet P to the duplex reversing conveyance path 170. After elapse of a predetermined time period from the detection of a trailing edge of the sheet P with use of the fixing sensor 131, the CPU 200 switches the position of the duplex flapper 140 to the position indicated by the solid line in FIG. 1A and, at the same time, rotates the duplex reversing rollers 180 backward to change a direction of conveyance of the sheet P to an opposite direction. The sheet P is conveyed to the registration rollers 110 through the duplex conveyance path 181. The CPU 200 starts the rotation of the registration rollers 110 at timing in synchronization with the toner image for the second surface, which is formed on the photosensitive drum 120, to convey the sheet P to the transfer portion TP. A subsequent operation is the same as that for the image formation for the first surface. The image for the second surface is formed on the back surface opposite to the front surface of the sheet P, on which the image for the first surface is formed. In this manner, the duplex printing is performed on the sheet P. The sheet P on which the duplex printing has been performed is discharged to the first tray 160 or the second tray 161 with the second surface oriented downward. The configuration and the operation of the image forming apparatus 1, which have been described above, are merely an example. The present disclosure is not limited to the configuration and the operation described above.

<Description of Jam Processing performed by Image Forming Apparatus>

Next, with reference to FIG. 1A, FIG. 1B, and FIG. 2, removal of a remaining sheet from the image forming apparatus 1 by the user in a case in which a jam of the sheet occurs in the image forming apparatus 1 is described. When a time period during which the fixing sensor 131 or the duplex sensor 182 has detected the sheet P is equal to or longer than a predetermined time period or a time period during which the fixing sensor 131 or the duplex sensor 182 has not detected the sheet P is equal to or longer than a predetermined time period, the CPU 200 determines that the sheet jam has occurred in the image forming apparatus 1. After determining the occurrence of the jam, the CPU 200 stops the image forming portion 220, the feed portion 230, the discharge portion 240, the duplex reversing portion 290, and the sheet conveyance portion 331 to stop the printing process. In order to cancel the jam, the user opens the printer door 183 to remove the remaining sheet P from the image forming apparatus 1. After the jam is cancelled and the CPU 200 determines that the printer door 183 is closed based on the detection signal from the door opening and closing sensor 184, the CPU 200 restarts the printing process.

<Description of Jam Processing in Discharge Unit>

Figure 3:
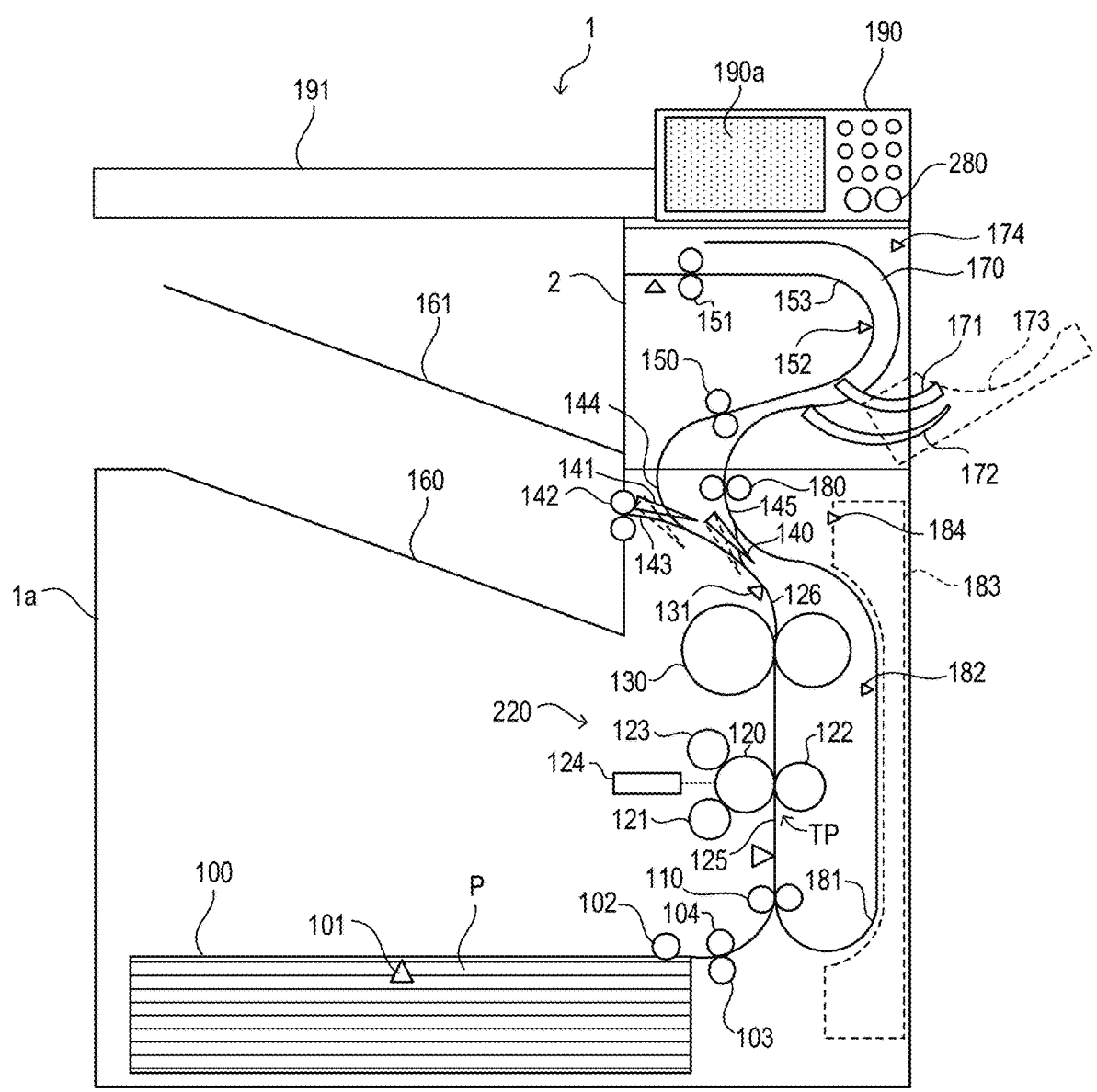
FIG. 3 is a sectional view of the image forming apparatus with a discharge unit door open.

Next, with reference to FIG. 2 and FIG. 3, removal of the remaining sheet from the discharge unit 2 by the user in a case in which the jam of the sheet occurs in the discharge unit 2 is described. When a time period during which the conveyance path sensor 152 in the discharge unit 2 has detected the sheet P is equal to or longer than a predetermined time period or a time period during which the conveyance path sensor 152 has not detected the sheet P is equal to or longer than a predetermined time period, the CPU 200 determines that the jam of the sheet has occurred in the discharge unit 2. When determining that the jam has occurred, the CPU 200 stops the image forming portion 220, the feed portion 230, the discharge portion 240, the duplex reversing portion 290, and the sheet conveyance portion 331 to stop the printing process. In order to cancel the jam, the user opens the discharge unit door 173 to remove the remaining sheet P from the discharge unit 2. FIG. 3 is a sectional view of the image forming apparatus 1 with the discharge unit door 173 open. After the jam is cancelled and the CPU 200 determines that the discharge unit door 173 is closed based on the detection signal from the discharge unit door sensor 174, the CPU 200 restarts the printing process.

<Limited-Function Mode for Discharge Unit>

Next, with reference to FIG. 1A and FIG. 2, a limited-function mode relating to the discharge unit 2 in a case in which the discharge unit 2 is in failure is described. As illustrated in FIG. 2, the discharge unit 2 includes a motor configured to rotate the inlet rollers 150 and the discharge rollers 151, which are configured to convey the sheet P. The motor is provided in the sheet conveyance portion 331. In order to discharge the sheet P carrying the image formed thereon to the second tray 161, the sheet conveyance portion 331 is driven to rotate the inlet rollers 150 and the discharge rollers 151. When the sheet conveyance portion 331 is in failure, the discharge unit 2 cannot discharge the sheet P to the second tray 161. Specifically, when the sheet conveyance portion 331 is in failure, the entire discharge unit 2 cannot be used.

However, when the use of the image forming apparatus 1 is prohibited because of the failure of the sheet conveyance portion 331 of the discharge unit 2, the printing operation cannot be performed, which is inconvenient for the user. Thus, after the limited-function mode for the discharge unit 2 is set, the discharge to the second tray 161 of the discharge unit 2 in which the failure has occurred is prohibited. However, the use of the image forming apparatus 1 is permitted. The limited-function mode for the discharge unit 2 is also referred to as "discharge prohibition mode". In the discharge prohibition mode, the discharge of the sheet to the second tray 161 of the discharge unit 2 is prohibited. However, the conveyance of the sheet to the duplex reversing conveyance path 170 is permitted. The user can set the discharge prohibition mode through the operation display unit 190. With the operation of the image forming apparatus 1 in the discharge prohibition mode, the user can allow the image forming apparatus 1 to execute the printing operation of discharging the sheet P to the first tray 160. A drive portion configured to convey the sheet is not provided to the duplex reversing conveyance path 170 in the discharge unit 2. When conveyance rollers configured to convey the sheet are provided to the duplex reversing conveyance path 170, the conveyance rollers are coupled to the duplex reversing portion 290 of the image forming apparatus 1 to be driven. In this case, the sheet is conveyed through the duplex reversing conveyance path 170 in the discharge unit 2 by the duplex reversing portion 290 of the image forming apparatus 1. Thus, even when the image forming apparatus 1 operates in the discharge prohibition mode, the duplex printing with the conveyance of the sheet to the duplex reversing conveyance path 170 can be executed.

<Description of Discharge Unit Door Open/Closed State in Duplex Printing performed in Discharge Prohibition Mode>

In the discharge prohibition mode, simplex printing and the duplex printing in which the sheet P carrying the image formed thereon is discharged to the first tray 160 can be executed. In a case of the simplex printing, the sheet P passes only through the main body 1a of the image forming apparatus 1 to be discharged to the first tray 160. Meanwhile, in a case of the duplex printing, when the front surface and the back surface of the sheet P are reversed by the duplex reversing rollers 180, the sheet P is temporarily moved into the duplex reversing conveyance path 170 in the discharge unit 2. When the discharge unit door 173 is opened, the discharge unit conveyance guide 171 and the discharge unit duplex reversing guide 172, which define the duplex reversing conveyance path 170, are moved toward the discharge unit door 173. Thus, when the discharge unit door 173 is open, the duplex reversing conveyance path 170 in the discharge unit 2 is opened. Thus, there arises a risk in that the sheet P may not normally be conveyed and reversed. As described above, when the discharge unit door 173 is open in a case in which the image forming apparatus 1 operates in the discharge prohibition mode due to a failure of the discharge unit 2, there is a fear of occurrence of faulty conveyance of the sheet in the duplex printing. Accordingly, in this embodiment, when the discharge unit door 173 is open in a case in which the image forming apparatus 1 operates in the discharge prohibition mode and the duplex printing is executed, the conveyance of the sheet to the duplex reversing conveyance path 170 is prohibited.

<Printing Process in Discharge Prohibition Mode>

Now, with reference to FIG. 4 which is composed of FIG. 4A and FIG. 4B, the printing process performed by the image forming apparatus 1 when the image forming apparatus 1 operates in the discharge prohibition mode in this embodiment is described. FIG. 4A and FIG. 4B are flowcharts for illustrating the printing process performed by the image forming apparatus 1 when the image forming apparatus 1 operates in the discharge prohibition mode. The CPU 200 determines a transition to the discharge prohibition mode and controls the image forming apparatus 1 to execute the printing process in accordance with programs stored in the ROM 201. When the power switch 280 is pressed, the CPU 200 detects connection for whether or not the discharge unit 2 is connected to the image forming apparatus 1 via the discharge unit OF 270 and stores a result of the detection of connection in the RAM 202 (Step S101).

The CPU 200 determines whether or not power OFF is requested based on pressing of the power switch 280 (Step S102). When the power OFF is not requested (NO in Step S102), the CPU 200 determines whether or not the discharge unit 2 is connected to the image forming apparatus 1 based on the result of the detection of connection, which is stored in the RAM 202 (Step S103). When the discharge unit 2 is connected to the image forming apparatus 1 (YES in Step S103), the CPU 200 determines whether or not "presence" is set in discharge unit limited-function information stored in the RAM 202 (Step S104). When the user selects the discharge prohibition mode (limited-function mode for the discharge unit 2) through the operation display unit 190, the "presence" is set in the discharge unit limited-function information stored in the RAM 202. When the "presence" is not set in the discharge unit limited-function information (NO in Step S104), the CPU 200 disables the limited-function mode for the discharge unit in the RAM 202 (Step S105).

The discharge unit 2 is connected to the image forming apparatus 1. Thus, the CPU 200 determines whether or not a failure of the sheet conveyance portion 331 has been detected with use of the failure detector 351 (Step S106). When the failure of the sheet conveyance portion 331 has been detected (YES in Step S106), the CPU 200 stops the drive of the sheet conveyance portion 331 to prohibit the discharge of the sheet P to the second tray 161 of the discharge unit 2 (Step S107).

FIG. 5 is a view for illustrating a discharge unit limited-function screen 410 displayed on the operation display unit 190. The CPU 200 displays the discharge unit limited-function screen 410 illustrated in FIG. 5 on the operation display unit 190 (Step S108) to urge the user to decide whether or not to select the limited-function mode for the discharge unit. The CPU 200 determines whether or not a selection button is pressed by the user (a "YES" button 411 or a "NO" button 412) on the discharge unit limited-function screen 410 (Step S109). When the selection button is not pressed (NO in Step S109), the CPU 200 waits until the selection button is pressed (Step S109). When the selection button is pressed (YES in Step S109), the CPU 200 determines whether the pressed selection button is the "YES" button 411 or not (Step S110). When the pressed selection button is the "YES" button 411 (YES in Step S110), the CPU 200 sets the "presence" in the discharge unit limited-function information stored in the RAM 202 and stores a preset value (Step S111). The CPU 200 returns the processing to Step S102. When the pressed selection button is not the "YES" button 411 (NO in Step S110), the "absence" is set in the discharge unit limited-function information and a preset value is stored (Step S112). FIG. 6 is a view for illustrating a discharge unit failure screen 420 displayed on the operation display unit 190. The CPU 200 displays the discharge unit failure screen 420 illustrated in FIG. 6 on the operation display unit 190 (Step S113) to inform the user of occurrence of an abnormality in the discharge unit 2. Then, the CPU 200 returns the processing to Step S102.

When a failure of the sheet conveyance portion 331 of the discharge unit 2 is not detected (NO in Step S106), the CPU 200 determines whether or not a jam of the sheet P has occurred in the discharge unit 2 based on a result of detection performed by the discharge unit sheet detector 341 (Step S114). FIG. 7 is a view for illustrating a jam notification screen 430 in the discharge unit, which is displayed on the operation display unit 190. When the jam of the sheet P has occurred in the discharge unit 2 (YES in Step S114), the CPU 200 displays the jam notification screen 430 containing a message 431 that "PLEASE REMOVE SHEET", illustrated in FIG. 7, on the operation display unit 190 (Step S115). With the message 431, the user is urged to perform jam processing for the discharge unit 2. Then, the CPU 200 returns the processing to Step S102.

When the jam of the sheet P has not occurred in the discharge unit 2 (NO in Step S114), the CPU 200 determines whether or not the discharge unit door 173 is open based on the result of detection performed by the discharge unit door detector 321 (Step S116). FIG. 8 is a view for illustrating a notification screen 440 displayed on the operation display unit 190 when the discharge unit door 173 is open. When the discharge unit door 173 is open (YES in Step S116), the CPU 200 displays the notification screen 440 containing a message 441 that "PLEASE CLOSE DISCHARGE UNIT DOOR", which is illustrated in FIG. 8, on the operation display unit 190 (Step S117). With the message 441, the user is urged to close the discharge unit door 173. Then, the CPU 200 returns the processing to Step S102.

When the discharge unit door 173 is closed (NO in Step S116), the CPU 200 determines whether or not the jam of the sheet P has occurred in the image forming apparatus 1 based on a result of detection performed by the conveyance path sheet detector 250 (Step S119). When the "presence" is set in the discharge unit limited-function information in Step S104 (YES in Step S104), the CPU 200 enables the limited-function mode for the discharge unit, in the discharge unit limited-function information stored in the RAM 202 (Step S118). The CPU 200 determines whether or not the jam of the sheet P has occurred in the image forming apparatus 1 based on the result of detection performed by the conveyance path sheet detector 250 (Step S119). When the discharge unit 2 is not connected to the image forming apparatus 1, it is not required to determine whether or not the "presence" is set in the discharge unit limited-function information. Thus, when the discharge unit 2 is not connected to the image forming apparatus 1 in Step S103 (NO in Step S103), the CPU 200 determines whether or not the jam of the sheet P has occurred in the image forming apparatus 1 based on the result of determination performed by the conveyance path sheet detector 250 (Step S119).

FIG. 9 is a view for illustrating a jam notification screen 450 for a jam occurring in the image forming apparatus, which is displayed on the operation display unit 190. When the jam of the sheet P has occurred in the image forming apparatus (YES in Step S119), the CPU 200 displays the jam notification screen 450 containing a message 451 that "PLEASE REMOVE SHEET", which is illustrated in FIG. 9, on the operation display unit 190 (Step S120). With the message 451, the user is urged to perform the jam processing for the image forming apparatus 1. Then, the CPU returns the processing to Step S102.

When the jam of the sheet P has not occurred in the image forming apparatus 1 (NO in Step S119), the CPU 200 determines whether or not the printer door 183 is open based on a result of detection performed by the door opening and closing detector 260 (Step S121). FIG. 10 is a view for illustrating a notification screen 460 relating to printer door opening, which is displayed on the operation display unit 190. When the printer door 183 is open (YES in Step S121), the CPU 200 displays the notification screen 460 containing a message 461 that "PLEASE CLOSE PRINTER DOOR", which is illustrated in FIG. 10, on the operation display unit 190 (Step S122). With the message 461, the user is urged to close the printer door 183 (Step S122). Then, the CPU 200 returns the processing to Step S102.

When the printer door 183 is closed (NO in Step S121), the CPU 200 displays a message indicating that printing is possible on the operation display unit 190 (Step S123). Then, the CPU 200 determines whether or not there is a print job (Step S124). When there is no print job (NO in Step S124), the CPU 200 returns the processing to Step S102. When there is a print job (YES in Step S124), the CPU 200 performs the printing process (Step S125). After termination of the printing process, the image forming apparatus 1 is brought into a standby state and the CPU 200 determines whether or not power OFF is requested (Step S102). When the power OFF is requested (YES in Step S102), the CPU 200 performs processing for turning off the power to turn off the power (Step S126). Then, the CPU 200 terminates the printing process performed by the image forming apparatus 1 in the discharge prohibition mode.

<Printing Process in Image Forming Apparatus>

Now, with reference to FIG. 11, the printing process in Step S125 of FIG. 4A is described. FIG. 11 is a flowchart for illustrating the printing process performed in the image forming apparatus 1, which is executed by the CPU 200. The CPU 200 executes the printing process in the image forming apparatus 1 in accordance with a program stored in the ROM 201. After the printing process is started, the CPU 200 determines whether or not the discharge unit 2 is connected to the image forming apparatus 1 based on the result of detection of connection, which is stored in the RAM 202 (Step S201). When the discharge unit 2 is connected to the image forming apparatus 1 (YES in Step S201), the CPU 200 determines whether or not the limited-function mode for the discharge unit is enabled based on the information stored in the RAM 202 (Step S202). When the limited-function mode for the discharge unit is enabled (YES in Step S202), the CPU 200 determines whether or not the print job is for the duplex printing (Step S203). When the discharge unit door 173 is open in a case in which the print job is for the duplex printing, a jam of the sheet P may occur at the time of duplex reversing of the sheet P. Thus, when the print job is for the duplex printing (YES in Step S203), the CPU 200 determines whether or not the discharge unit door 173 is open based on a result of detection performed by the discharge unit door detector 321 (Step S204). When the discharge unit door 173 is open (YES in Step S204), the CPU 200 displays the notification screen 440 containing the message 441 that "PLEASE CLOSE DISCHARGE UNIT DOOR", which is illustrated in FIG. 8, on the operation display unit 190 (Step S205). The CPU 200 determines whether or not the printing has been cancelled (Step S206). When the printing has not been cancelled (NO in Step S206), the CPU 200 returns the processing to Step S204. When the printing has been cancelled (YES in Step S206), the printing process is terminated.

When the discharge unit door 173 is not open (NO in Step S204), there is no influence on the duplex printing, Thus, the CPU 200 displays a message "IN PRINT" on the operation display unit 190 (Step S207) and executes the printing (Step S208). When the discharge unit 2 is not connected to the image forming apparatus 1 in Step S201 (NO in Step S201), the CPU 200 displays the message "IN PRINT" on the operation display unit 190 (Step S207) and executes the printing (Step S208). When the limited-function mode for the discharge unit is disabled in Step S202 (NO in Step S202), the CPU 200 displays the message "IN PRINT" on the operation display unit 190 (Step S207) and executes the printing (Step S208). When the print job is not for the duplex printing in Step S203 (NO in Step S203), the CPU 200 displays the message "IN PRINT" on the operation display unit 190 (Step S207) and executes the printing (Step S208). Then, the CPU 200 terminates the printing process.

When the time period during which the conveyance path sheet detector 250 has detected the sheet P is equal to or longer than the predetermined time period or the time period during which the conveyance path sheet detector 250 has not detected the sheet P is equal to or longer than the predetermined time period in the printing process performed in Step S208, the CPU 200 determines that the jam of the sheet has occurred in the image forming apparatus 1. When the CPU 200 determines that the jam has occurred, the CPU 200 stops the operations of the image forming portion 220, the feed portion 230, the discharge portion 240, the duplex reversing portion 290, and the sheet conveyance portion 331 to stop the printing process. After the jam is cancelled, when the CPU 200 determines that the printer door 183 is closed based on the detection signal from the door opening and closing sensor 184, the CPU 200 restarts the printing process.

According to this embodiment, when the opening of the discharge unit door 173 is detected in a case in which the limited-function mode for the discharge unit is set, the conveyance of the sheet to the discharge unit 2 is prohibited to prevent the occurrence of the sheet jam. In this manner, usability can be improved. Further, in a case of the simplex printing, even when the discharge unit door 173 is open, the printing process is not interrupted. Thus, when the limited-function mode for the discharge unit is set, the simplex printing can be executed by the image forming apparatus 1 regardless of opening or closing of the discharge unit door. Further, this embodiment can be carried out without adding a component or using a high-quality component in place of an existing component, and hence cost is not increased. According to this embodiment, when the discharge unit 2 including the duplex reversing conveyance path 170 is in failure and the discharge unit door 173 of the discharge unit 2 is open, the conveyance of the sheet to the duplex reversing conveyance path 170 can be prohibited. In this manner, the sheet jam can be prevented to improve the usability.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-162037, filed Aug. 30, 2018, which is hereby incorporated by reference herein in its entirety.

What is claimed is:

1. An image forming apparatus comprising:
an image forming unit configured to form an image on a sheet;
a first discharge tray onto which the sheet on which the image is formed by the image forming unit is discharged through a first conveyance path;
a first branched path branched from the first conveyance path;
a second branched path branched from the first conveyance path on an upstream side of the first branched path;
a reverse conveying roller which is provided in the second branched path and configured to convey the sheet on which the image is formed on a first surface of the sheet by the image forming unit, in a first direction and a second direction opposite to the first direction so as to reverse a front surface and a back surface of the sheet;
a discharge unit configured to be removably mounted to a mounting portion provided in the image forming apparatus, the discharge unit including:
a reverse conveying path, which is to be connected to the second branched path in a case in which the discharge unit is mounted to the mounting portion, and through which the sheet is conveyed by a conveying force applied by the reverse conveying roller without having a drive portion for applying a conveying force to the sheet to be conveyed by the reverse conveying roller;
an openable and closable member configured to open and close the reverse conveying path;
an open/close sensor configured to detect opening and closing of the openable and closable member;
a second conveyance path which is to be connected to the first branched path in the case in which the discharge unit is mounted to the mounting portion;
a second discharge tray;
a sheet conveyance unit which is provided in the second conveyance path and configured to convey the sheet so as to discharge the sheet to the second discharge tray; and
a failure detector configured to detect a failure of the sheet conveyance unit; and
a controller,
wherein in a case in which the controller determines that the sheet conveyance unit is in failure based on a detection result of the failure detector and determines that the openable and closable member is closed based on a detection result of the open/close sensor, the controller prohibits discharge of the sheet to the second discharge tray and permits conveyance of the sheet to the reverse conveying path, and
wherein in a case in which the controller determines that the sheet conveyance unit is in failure and determines that the openable and closable member is open based on the detection result of the open/close sensor, the controller prohibits the conveyance of the sheet to the reverse conveying path.

2. The image forming apparatus according to claim 1, further comprising a display unit configured to display a state of the image forming apparatus, wherein in a case in which the controller determines that the openable and closable member is open based on the detection result of the open/close sensor, the controller displays an indication for urging closure of the openable and closable member on the display unit.

3. The image forming apparatus according to claim 1, further comprising a duplex conveyance path, which is branched from the second branched path, through which the sheet conveyed from the reverse conveying path in the second direction by the reverse conveying roller is conveyed to the image forming unit.

4. The image forming apparatus according to claim 1, wherein in a case in which the discharge unit is removed from the mounting portion, a second reverse conveying path is mounted to the mounting portion and the second branched path is connected to the second reverse conveying path.

5. The image forming apparatus according to claim 4, further comprising a duplex conveyance path through which the sheet conveyed from the second reverse conveying path in the second direction by the reverse conveying roller is conveyed to the image forming unit.

6. The image forming apparatus according to claim 1, wherein the discharge unit has a post-processing function of executing at least one of alignment, sorting, punching, or binding for the sheet.

7. The image forming apparatus according to claim 1, further comprising a guide member configured to define the reverse conveying path,
wherein the guide member is moved so as to open the reverse conveying path in conjunction with an opening and closing operation of the openable and closable member.

8. The image forming apparatus according to claim 1, further comprising a setting unit configured to set, in a case in which the sheet conveying unit is in failure, whether or not to enable a limited-function mode for limiting a function of the image forming apparatus to enable an image formation,
wherein in a case in which the limited-function mode is set to be enabled, the controller permits execution of a duplex printing with use of the reverse conveying path.

9. The image forming apparatus according to claim 1, wherein even in a case in which the controller determines that the sheet conveyance unit is in failure, the controller permits the image forming unit to form the image on the sheet.

10. The image forming apparatus according to claim 9, wherein even in the case in which the controller determines that the sheet conveyance unit is in failure and determines that the openable and closable member is open, the controller permits the image forming unit to execute a simplex printing.

11. The image forming apparatus according to claim 9, wherein even in the case in which the controller determines that the sheet conveyance unit is in failure and determines that the openable and closable member is closed, the controller permits the image forming unit to execute a duplex printing.

12. An image forming apparatus comprising:
an image forming unit configured to form an image on a sheet;
a reverse conveying roller configured to convey the sheet on which the image is formed on a first surface of the sheet by the image forming unit, in a first direction and a second direction opposite to the first direction so as to reverse a front surface and a back surface of the sheet;
a discharge unit including:
a reverse conveying path through which the sheet is conveyed by a conveying force applied by the reverse conveying roller without having a drive portion for applying a conveying force to the sheet to be conveyed by the reverse conveying roller;
an openable and closable member configured to open and close the reverse conveying path;
an open/close sensor configured to detect opening and closing of the openable and closable member;
a discharge tray;
a sheet conveyance unit configured to convey the sheet so as to discharge the sheet to the discharge tray; and
a failure detector configured to detect a failure of the sheet conveyance unit; and
a controller,
wherein in a case in which the controller determines that the sheet conveyance unit is in failure based on a detection result of the failure detector and determines that the openable and closable member is closed based on a detection result of the open/close sensor, the controller prohibits discharge of the sheet to the discharge tray and permits conveyance of the sheet to the reverse conveying path,
wherein in a case in which the controller determines that the sheet conveyance unit is in failure and determines that the openable and closable member is open based on the detection result of the open/close sensor, the controller prohibits the conveyance of the sheet to the reverse conveying path, and
wherein even in a case in which the controller determines that the sheet conveyance unit is in failure, the controller permits the image forming unit to form the image on the sheet.

13. The image forming apparatus according to claim 12, wherein even in the case in which the controller determines that the sheet conveyance unit is in failure and determines that the openable and closable member is open, the controller permits the image forming unit to execute a simplex printing.

14. The image forming apparatus according to claim 12, wherein even in the case in which the controller determines that the sheet conveyance unit is in failure and determines that the openable and closable member is closed, the controller permits the image forming unit to execute a duplex printing.

* * * * *